US012624582B2

(12) United States Patent
Bettcher, III et al.

(10) Patent No.: US 12,624,582 B2
(45) **Date of Patent: *May 12, 2026**

(54) OVERTRAVEL HINGE

(71) Applicant: The Braun Corporation, Winamac, IN (US)

(72) Inventors: Robert E. Bettcher, III, Winamac, IN (US); Russell Meyer, Fortville, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,706

(22) Filed: Feb. 26, 2024

(65) Prior Publication Data

US 2024/0191550 A1 Jun. 13, 2024

Related U.S. Application Data

(63) Continuation of application No. 17/551,418, filed on Dec. 15, 2021, now Pat. No. 11,913,267.

(Continued)

(51) Int. Cl.

*E05D 15/00* (2006.01)
*E05D 3/02* (2006.01)

(Continued)

(52) U.S. Cl.

CPC ............ *E05D 11/1057* (2013.01); *E05D 3/02* (2013.01); *E05D 5/062* (2013.01); *E05Y 2201/22* (2013.01);

(Continued)

(58) Field of Classification Search

CPC ............ E05D 15/0621; E05D 15/0604; E05D 15/0608; E05D 15/10; E05D 15/1042;

(Continued)

(56) References Cited

U.S. PATENT DOCUMENTS 3,735,531 A 5/1973 Kramer
4,152,872 A 5/1979 Tanizaki et al.

(Continued)

FOREIGN PATENT DOCUMENTS

CN 210634379 U * 5/2020
DE 10326241 A1 1/2005

(Continued)

OTHER PUBLICATIONS

International Search Report, Search Strategy, and Written Opinion of the International Searching Authority for PCT/US2021/063471, Apr. 12, 2022, 12 pages, International Searching Authority for the European Patent Office.

*Primary Examiner* — Chuck Y Mah

(74) *Attorney, Agent, or Firm* — Daniel Tallitsch; Tyler Schultz

(57) ABSTRACT

A vehicle includes a chassis, a door track, a door operatively connected to the door track and adapted to move between a closed position and an open position, and a hinge assembly coupled to the door. The hinge assembly is movably coupled to the door track and includes a first bracket coupled to the door, a second bracket coupled to the first bracket, and a transport assembly coupled to the second bracket and adapted to move along the door track as the door moves between the open and closed positions. The transport assembly includes a coupling member for releasably coupling the second bracket to the transport assembly. Upon movement of the second bracket from the first position to the second position, the door moves to an extended open position with respect to the door track.

20 Claims, 12 Drawing Sheets

Related U.S. Application Data

(60) Provisional application No. 63/127,322, filed on Dec. 18, 2020.

(51) Int. Cl.
*E05D 5/06* (2006.01)
*E05D 11/10* (2006.01)

(52) U.S. Cl.
CPC ... *E05Y 2201/488* (2013.01); *E05Y 2900/531* (2013.01)

(58) Field of Classification Search
CPC ....... E05D 15/26; E05D 15/266; E05D 15/30; E05D 15/58; E05D 2015/1005; E05D 2015/1026; E05D 2015/586; E05D 11/1057; E05D 11/1071; E05D 11/107; E05D 3/02; E05D 5/062; E05F 1/16; E05F 3/06; E05F 3/18; E05F 5/003; E05Y 2201/22; E05Y 2201/212; E05Y 2201/412; E05Y 2201/488; E05Y 2201/64; E05Y 2201/684; E05Y 2600/314; E05Y 2800/102; E05Y 2900/20; E05Y 2900/212; E05Y 2900/531; E06B 3/4762
See application file for complete search history.

(56) References Cited

U.S. PATENT DOCUMENTS

| | | | | |
|---|---|---|---|---|
| 8,122,644 | B2 * | 2/2012 | Jarolim | B61D 19/02 49/209 |
| 9,297,192 | B2 * | 3/2016 | Choi | E05D 15/101 |
| 2004/0139580 | A1 | 7/2004 | Hiramatsu | |
| 2009/0106940 | A1 | 4/2009 | Greenbank | |
| 2009/0230722 | A1 | 9/2009 | Krajenke et al. | |
| 2016/0312521 | A1 | 10/2016 | Berger et al. | |
| 2018/0119465 | A1 | 5/2018 | Wojdyla | |
| 2018/0128031 | A1 | 5/2018 | Ungetheim et al. | |
| 2022/0195773 | A1 | 6/2022 | Bettcher, III et al. | |

FOREIGN PATENT DOCUMENTS

| | | | | |
|---|---|---|---|---|
| DE | 102004033759 | A1 | 2/2006 | |
| DE | 102004039885 | A1 * | 2/2006 | B60J 5/06 |
| DE | 102007040941 | A1 | 3/2009 | |
| DE | 102007053994 | A1 * | 5/2009 | E05D 11/1007 |
| DE | 102019115225 | A1 | 5/2020 | |
| FR | 2727460 | A1 | 5/1996 | |
| KR | 20020005261 | A | 1/2002 | |
| WO | 2017142909 | A1 | 8/2017 | |

* cited by examiner

OVERTRAVEL HINGE

CROSS REFERENCE TO OTHER APPLICATIONS

The present application is a continuation of U.S. patent application Ser. No. 17/551,418, filed Dec. 15, 2021 and entitled "OVERTRAVEL HINGE," which claims priority to U.S. Provisional Patent Application Ser. No. 63/127,322, filed Dec. 18, 2020 and entitled "OVERTRAVEL HINGE," the disclosures of which are hereby incorporated by reference in their entirety.

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry and exit of the physically limited individual through what is known as the assisted entrance. Once inside the van, individual who uses the assisted entrance is located in a rear passenger compartment of the van adjacent to or behind the assisted entrance.

In a retrofitted van, the sliding side door moves toward the back of the vehicle to open a passenger entrance as well as to provide access to a ramp located beneath the floor. In some vehicles, which are considered as viable candidates for retrofitting, the construction of the OEM vehicle requires modification to accommodate the addition of a ramp. Not only must a subfloor be added, but the door opening needs to be widened to provide access for a wheelchair. Consequently, there is a need for a modification to an OEM vehicle to provide access to physically limited individuals or individuals confined to a wheelchair or other mobility alternatives to wheelchairs.

SUMMARY OF THE EMBODIMENTS

In one embodiment of the present disclosure, a vehicle includes a chassis, a door track coupled to the chassis, a door operatively connected to the door track and adapted to move between a closed position and an open position, and a hinge assembly coupled to the door and movably coupled to the door track. The hinge assembly includes a first bracket coupled to the door, a second bracket coupled to the first bracket, and a transport assembly coupled to the second bracket and adapted to move along the door track as the door moves between the open and closed positions. The transport assembly includes a coupling member for releasably coupling the second bracket to the transport assembly. The track includes a trigger disposed along a path of travel taken by the hinge assembly, wherein contact between the coupling member and the trigger releases the second bracket from the transport assembly to move from a first position to a second position. Upon movement of the second bracket from the first position to the second position, the door moves to an extended open position with respect to the door track.

In one example of this embodiment, the track comprises a first end and a second end, the door being in the closed position when the hinge assembly is located at the first end and the door being in the open position when the hinge assembly is located at the second end. In this example, when the hinge assembly moves to the second end of the track, the second bracket is released from the transport assembly. In a second example, when the hinge assembly reaches the second end of the track, the transport assembly remains substantially fixed relative to the track as the second bracket moves from its first position to its second position.

In another example of this embodiment, the second bracket pivots relative to the transport assembly between the first and second positions. In yet another example, when the hinge assembly is at the first end of the track, the first bracket is pivoted inwardly in close proximity to the second bracket. As the hinge assembly moves from the first end, the first bracket pivots away from the second bracket. In a further example, the coupling member is pivotally coupled to the transport assembly. Here, the coupling member comprising a pawl configured to contact the trigger to induce pivotal movement of the coupling member and release the second bracket from the transport assembly. In yet a further example, the second bracket comprises a pin configured to be releasably coupled to the coupling member. In the first position, the coupling member is coupled to the pin, and in the second position, the coupling member is released from the pin.

In another example of this embodiment, the transport assembly comprises at least one rolling member configured to roll along the track as the door moves between the open and closed positions. In yet another example, the hinge assembly is movably disposed in at least a first configuration, a second configuration, and a third configuration. In the first configuration, the door is in its closed position, the hinge assembly is at the first end, the first bracket is pivoted inwardly and the second bracket extends outwardly in a substantially perpendicular position relative the track. In the second configuration, the door is located between the open and closed positions, the hinge assembly is at the second end of the track, the first bracket is pivoted outwardly and arranged substantially perpendicular to the second bracket, and the second bracket extends outwardly in a substantially perpendicular position relative the track. In the third configuration, the door is located in the closed position, the hinge assembly is at the second end of the track, and the second bracket is pivoted relative to the transport assembly such that the second bracket extends angularly outwardly relative to the track.

In a different example, a hinge is located between the first bracket and second bracket, where the first bracket pivots relative to the second bracket about the hinge. Further, a biasing mechanism is coupled between the hinge and the transport assembly such that the biasing member is adapted to bias the hinge assembly to a closed configuration. In a further example, the hinge assembly is movable between a closed configuration, an open configuration, and an extended configuration, where the hinge assembly is in the closed configuration when the door is in its closed position and the hinge assembly is in the extended configuration when the door is in its open position.

In another embodiment of the present disclosure, an overtravel hinge assembly is provided for a vehicle door operatively coupled to a door track of a passenger vehicle. The overtravel hinge assembly includes a first bracket adapted to be mounted to the vehicle door, a second bracket pivotally coupled to the first bracket via a hinge, and a transport assembly pivotally coupled to the second bracket. The transport assembly has a coupling member for releasably coupling the second bracket to the transport assembly and a movable member adapted to contact and move along the door track as the vehicle door moves between an open and closed positions. The hinge assembly is configured to move between at least a closed configuration, an open configuration, and an extended configuration.

In one example of this embodiment, in the closed configuration, the first bracket is pivoted inwardly in close proximity to the second bracket, and the second bracket extends outwardly in a substantially perpendicular position relative the transport assembly. In the open configuration, the first bracket is pivoted outwardly about the hinge and arranged substantially perpendicular to the second bracket, and the second bracket extends outwardly in a substantially perpendicular position relative the transport assembly. In the extended configuration, the second bracket extends outwardly from the transport assembly at an angle greater than 90°.

In another example, a biasing mechanism is coupled between the hinge and the transport assembly, where the biasing member is adapted to bias the hinge assembly to the closed configuration. In a further example, the coupling member is pivotally coupled to the transport assembly. Here, the coupling member has a pawl configured to contact a portion of the track to induce pivotal movement of the coupling member and release the second bracket from the transport assembly. In yet another example, the second bracket comprises a pin configured to be releasably coupled to the coupling member. In the closed configuration, the coupling member is coupled to the pin, whereas in the extended configuration, the coupling member is released from the pin.

In a further example of this embodiment, the overtravel hinge includes a first biasing mechanism coupled between the hinge and the transport assembly, and a second biasing mechanism coupled between a base of the transport assembly and the coupling member. In this example, the second biasing mechanism is configured to bias the coupling member into contact with the pin. In another example, the movable member includes at least one wheel or roller bearing.

In a further embodiment of the present disclosure, a hinge assembly is provided for movably coupling a vehicle door to a vehicle between an open position and a closed position. The vehicle has a chassis and a track coupled to the chassis, and the hinge assembly includes a first bracket adapted to be mounted to the vehicle door, a second bracket coupled to the first bracket, and a transport assembly coupled to the second bracket and adapted to move in contact with the track. The hinge assembly is configured to move between at least a first configuration, a second configuration, and a third configuration. In the first and second configurations, the second bracket extends outwardly at a first angle relative to the transport assembly, and in the third configuration, the second bracket extends outwardly at a second angle relative to the transport assembly, where the second angle is greater than the first angle.

In one example of this embodiment, the hinge assembly may include a coupling member for releasably coupling the second bracket to the transport assembly and a biasing mechanism coupled to the transport assembly. The biasing member may be adapted to bias the hinge assembly to the first configuration.

In a different embodiment of the present disclosure, a motor vehicle may have a body, wherein the motor vehicle includes a track mounted to the body, the track having a first end and a second end, and a door adapted to move from a closed position to an open position. An overtravel hinge includes a door bracket mounted to the door and a link bracket including a pin, wherein the link bracket is rotatably coupled the door bracket. The overtravel hinge further includes a transport assembly having a latch releasably coupled to the pin, wherein the transport assembly movably engages the track. A trigger is mounted at the track, wherein the trigger is aligned along a path taken by the overtravel hinge. Contact of the trigger with the latch releases the latch from the pin to enable the link bracket to move with respect to the transport assembly.

In an alternative embodiment, there is provided an overtravel hinge for a sliding door operatively coupled to a track of a passenger vehicle. The overtravel hinge includes a door bracket adapted to couple to the door and a link bracket pivotally coupled to the door bracket, wherein the link bracket includes a pin. A roller assembly of the overtravel hinge is configured to move along the track, wherein the roller assembly includes a latch having a cutout and a pawl configured to engage a trigger. Contact of the pawl with the trigger moves the cutout away from the pin to enable movement of the link bracket with respect to the roller assembly.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
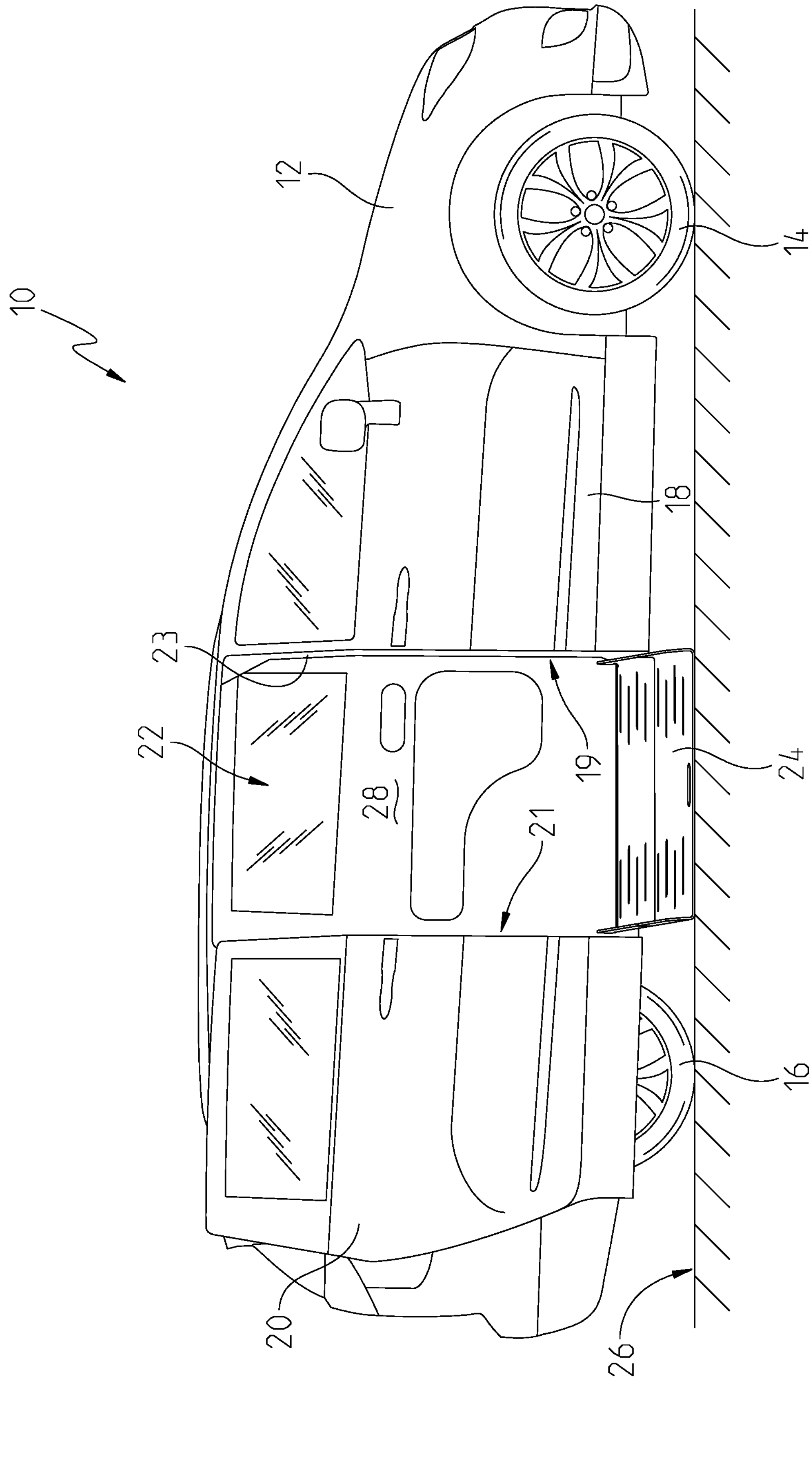
FIG. 1 illustrates an elevational side view of a passenger vehicle including an access ramp.

In FIG. 1, one embodiment of a vehicle 10, commonly identified as a passenger van, available from any number of United States and foreign manufacturers, is illustrated. In the illustrated embodiment, the vehicle 10 may include a unibody construction, but other vehicles having a frame on body construction, are also contemplated in the present disclosure. Consequently, the use of vehicle herein includes all types and kinds of vehicles with a body on frame construction, a unibody construction, or other constructions. In addition, while the passenger van 10 is illustrated in FIG. 1, the present disclosure is directed to all passenger or motorized vehicles carrying one or more passengers.

In one embodiment, the vehicle 10 may include a body 12 operatively coupled to front wheels 14 and rear wheels 16. Here, the vehicle 10 includes a unibody construction. A first passenger side door 18 may be located between the front wheels 14 and rear wheels 16 such that the door 18 provides access to a passenger for sitting in a front seat of the vehicle 10 adjacent to the driver.

In another embodiment, the vehicle 10 may include a second passenger side door 20 coupled to the unibody frame through a sliding mechanism or the like. The frame or body 12 may include at least one track, for example, to enable a sliding mechanism coupled to the side door 20 to move between an open position and a closed position. In one example, the vehicle 10 may include more than one track. In another example, the vehicle 10 may include a plurality of tracks. In a further example, the vehicle 10 may include two or more tracks. In other embodiments, any number of tracks may be possible.

In one embodiment, the sliding mechanism may be modified to slide along one or more of the tracks to increase the size of an opening 22 to the interior 28 of the vehicle 10. For example, in one aspect, a roller assembly may roll along the one or more door tracks. In other aspects, the assembly may include a sliding assembly, such that the overall motion or movement of the door along the one or more tracks is a substantially sliding motion. The increased opening 22 may provide better access to a physically limited passenger or a passenger seated in a wheelchair. In one embodiment, the opening 22 may be defined on the sides thereof by an edge 19 of a B-pillar 23 of the vehicle and the edge 21 of the door 20. In some embodiments, an edge of a C-pillar, as is known by those skilled in the art, can define the opening as well. A door handle 25 may be used to open and close the door 20.

In another embodiment, the vehicle 10 may be further modified to include a ramp assembly 24 which provides rolling access of a wheelchair from a ground surface 26 into an interior 28 of the vehicle 10. The ramp assembly 24 may be installed at the opening 22 and is movable between the interior 28 of the vehicle, where it may be stored in some embodiments, and to the exterior for wheelchair access. As illustrated in FIG. 1, the ramp 24 may be a floor mounted fold-out ramp. In other embodiments, the ramp may be located beneath the floor (i.e., stored in a cassette-like compartment) or mounted to the floor.

In some embodiments, a modified vehicle such as a modified van may include a plurality of rows of seats for passengers to be seated. In one instance, one row of seats may be removed from the manufacturer supplied vehicle to enable access to a wheelchair supporting a passenger. Once the wheelchaired passenger moves into the interior of the vehicle, the passenger or caregiver may locate the wheelchair in a central or middle portion of the interior behind the driver and passenger seats of the front row. As described herein, a wheelchaired passenger may be used to indicate that the individual is making use of a wheelchair, whether that use is temporary or permanent. Other types of mobility assistance devices are contemplated. In other embodiments, wheelchair users also use the front seating area of the vehicle. The principles and teachings of the present disclosure may also be applicable to a physically limited passenger who is not making use of a wheelchair. Moreover, a lift may be implemented with a vehicle instead of a ramp. Other devices may be used to assist with moving a physically limited passenger into and out of a vehicle.

Figure 2:
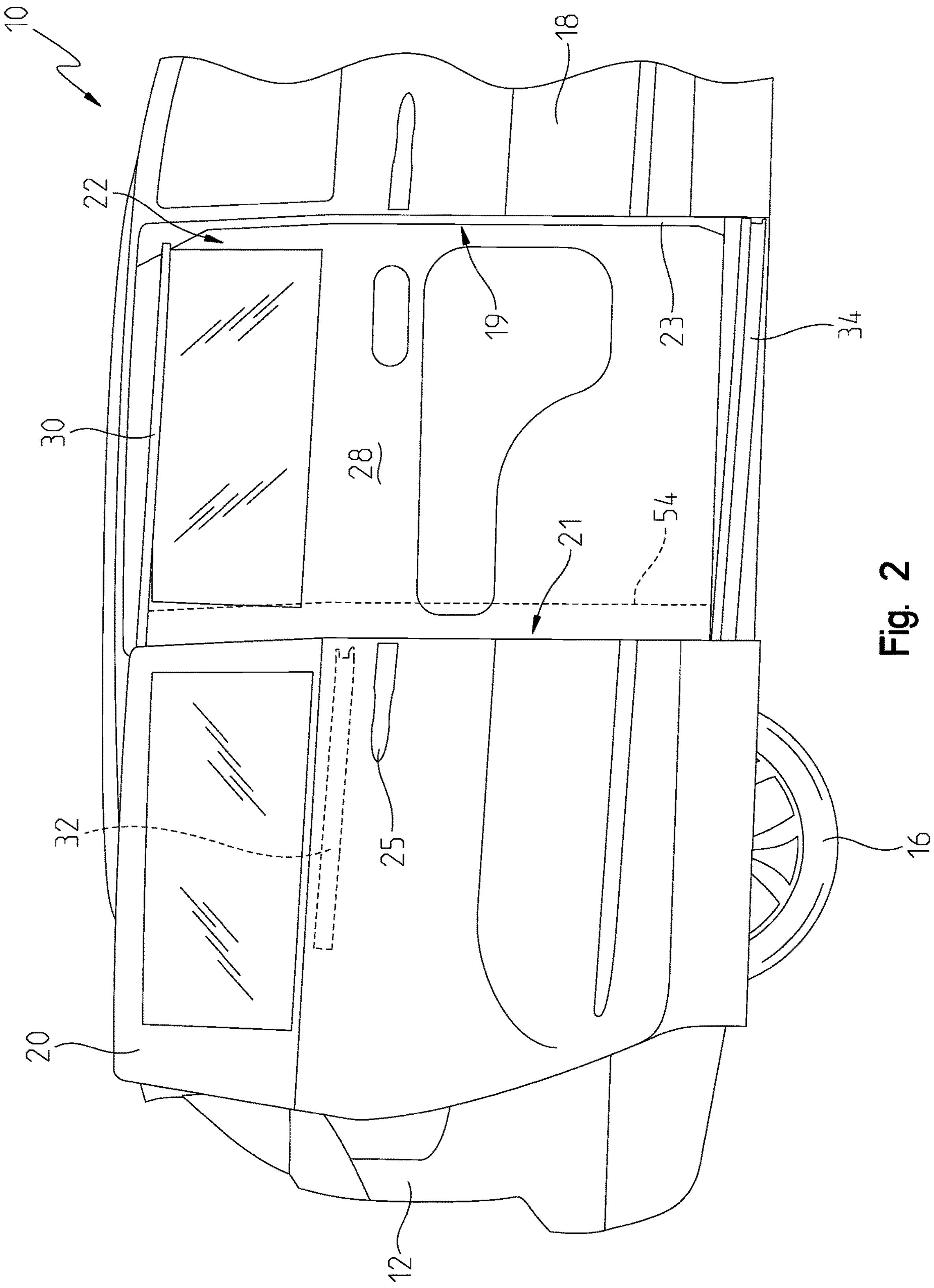
FIG. 2 illustrates an elevational side view of a passenger vehicle having a first, second, and third track adapted to provide for sliding movement of a door from a closed position to an open position having additional travel.

As shown in FIG. 2, one embodiment of the vehicle 10 may include a first track 30, a second track 32, and a third track 34, each of which may be adapted to enable movement of the door 20 between a closed position and an open position. In one embodiment, an upper portion of the body 12 of the vehicle 10 may support the first track 30, and a lower portion of the body 12 may support the third track 34. In another embodiment, the second track 32 may be supported by the body but is located at a position between the first and third tracks. For example, the second track 32 may be disposed at a bottom portion of a side window.

In several embodiments, a side door 20 may be movable relative to the body 12 via a sliding movement, rolling movement, or a combination thereof. In at least one embodiment, the door 20 may include a mechanism which engages at least one of the tracks to facilitate the movement.

Figure 3:
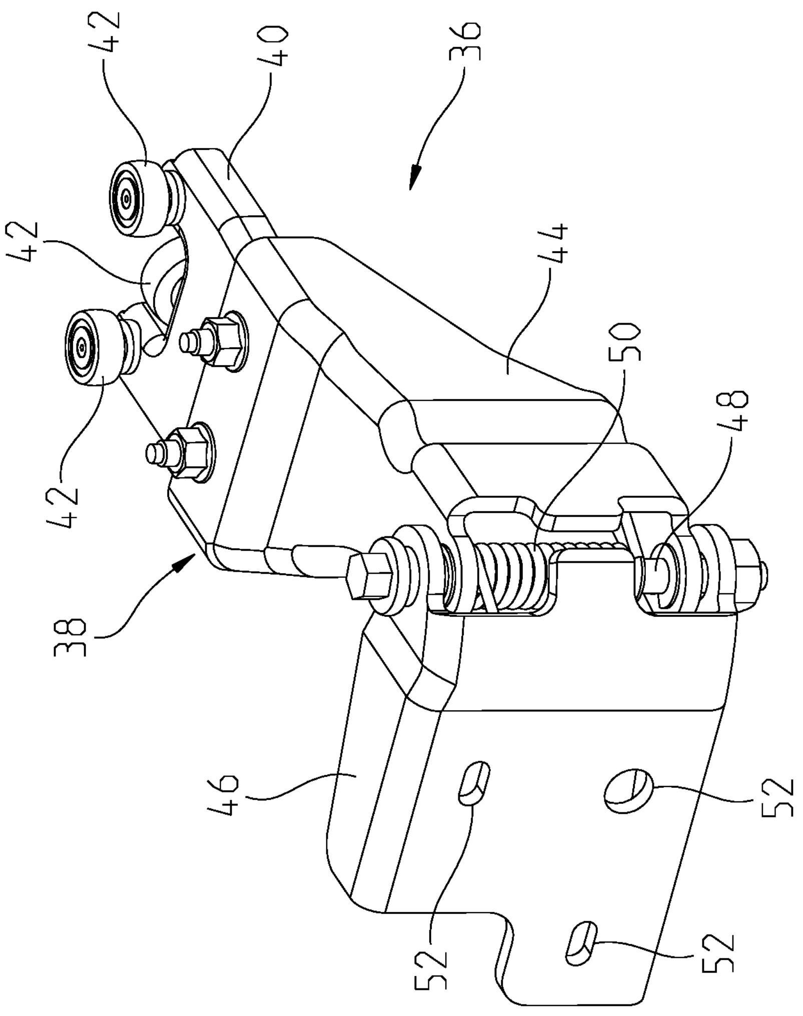
Fig. 3 Prior Art
FIG. 3 illustrates a perspective view of a prior art door hinge.

In one embodiment of a conventional vehicle passenger door, a sliding door hinge 36, such as the conventional sliding door hinge 36 of FIG. 3, may be coupled to an interior of the door 20 and may be movably coupled to one or more of the first track 30, the second track 32, and the third track 34. The sliding door hinge 36 may include a sliding member 38 having a first part 40 which engages a track with a plurality of roller bearings 42. The sliding member 38 includes a bracket support 44, coupled to the first part 40, to locate the door 20 at an appropriate distance from the body 12 of the vehicle 10. A door bracket 46 may be rotatably coupled to the bracket support 44 at a pin 48 which enables pivotal movement of the bracket 46 about an axis defined by the pin 48 with the bracket support 44. A spring 50 of the conventional sliding door hinge 36 may provide a predetermined amount of tension between the bracket support 44 and the door bracket 46 to reduce play between the two brackets. The door bracket 46 may include a plurality of apertures which provides openings 52 for connectors to engage the sliding door hinge 36 to an inside of the door 20.

In an OEM or conventional vehicle, three sliding door hinges are generally coupled to the inside of the door 20 such that each one engages one of the tracks 30, 32, and 34.

The sliding door hinge 36 may be typically located at the middle track 32. Other types of sliding door hinges may be configured to engage the tracks 30 and 34. When conventional hinges 36 are used in the OEM or conventional vehicle, however, the size of the opening 22 is generally defined between the edge 19 of the B-pillar 23 and the edge 21 of the door 20. In FIG. 2, a vertical broken line 54 is illustrated representing a maximum distance by which the edge 21 of the conventional door is able to move in an opening direction. Here, due to the limited movement of the conventional door hinge 36, the door 20 is limited in its movement and can open no further than this location 54. Thus, the size of the conventional door opening is defined between the edge 19 of the B-pillar 23 and the location 54 shown in broken line in FIG. 2. In other OEM vehicles, the edge of the C-pillar can also determine the size of the opening. In any event, the size of the door opening 22 is insufficient to provide adequate access to a wheelchair or a wheelchaired individual. Thus, there is a need for a modified door hinge to enable the door to move further rearward and increase the door opening size.

Figure 4:
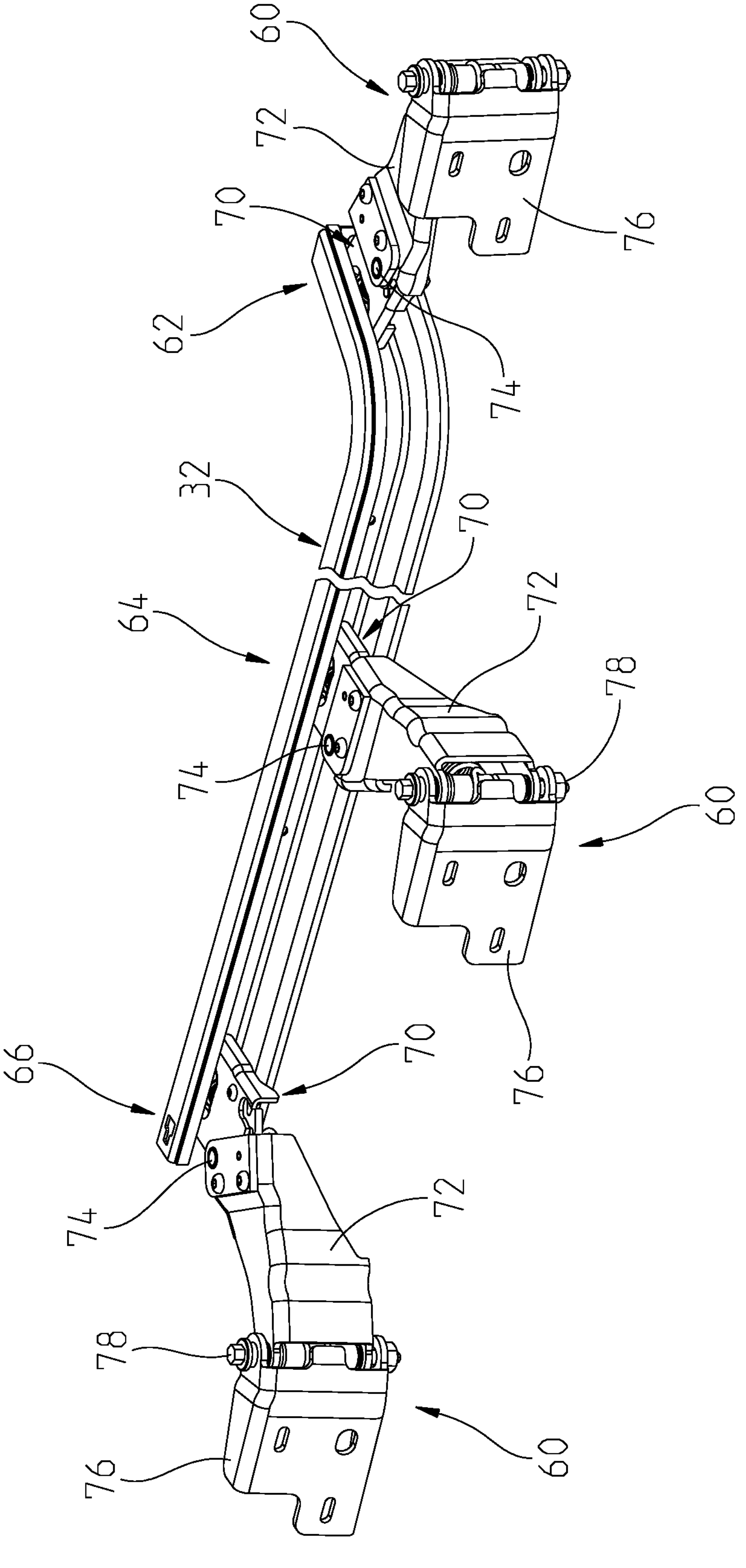
FIG. 4 illustrates a perspective view of an overtravel hinge in a first position, a second position, and a third position with respect to a vehicle door track.

In one embodiment, to increase the size of the door opening 22, an overtravel hinge 60, as illustrated in FIG. 4, may movably engage one or more tracks of a vehicle. In FIG. 4, for example, the vehicle may include the vehicle track 32 as shown. It is to be understood, however, that the principles and teachings of the present disclosure may apply to the first track 30, third track 34, or any other track of a vehicle. In other embodiments, a single overtravel hinge 60 may be used at the middle track 32 and other hinges, not necessarily the conventional hinge of FIG. 3, are used. In an alternative embodiment, each track of the vehicle may be engaged by an overtravel hinge 60.

In the embodiment of FIG. 4, the overtravel hinge 60 is shown at different locations of the track 32 as the vehicle door 20 is moved from a closed position to an open position. In a first position 62 at one end of the track 32, the hinge 60 may be disposed in a collapsed or fully closed condition. In this position, the door 20 may be in the closed position. In a second position 64, the hinge 60 may be in a partially deployed or partially open condition. Here, the door 20 may be located at a position inbetween the closed position and open position. In a third position 66, the hinge 60 may be in a fully deployed or fully open condition. In this position, the door 20 may be in a fully open position. In this fully open position, the edge 21 of the door 20 may be located further rearward of the location 54 shown in FIG. 2 so that the door opening is increased. In one example, the door opening 22 may be increased by at least one inch. In another example, the door opening 22 may be increased by one or more inches. In a further example, the door opening 22 may be increased by at least 3 or more inches. In any event, the door 20 is capable of moving further rearward, and the amount or distance by which the door 20 moves further rearward corresponds with the increased width of the door opening 22.

In one embodiment, and as also shown in FIG. 4, the retractable hinge 60 may include a roller or transport assembly 70 that is configured to operatively connect to the track 32. The roller or transport assembly 70 may move along track between the first position 62 and the third position 66. In another embodiment, a link bracket 72 may be rotatably coupled to the roller assembly 70 at a pivot 74. Further, a door bracket 76 may be rotatably coupled to the link bracket 72 at a hinge 78, as shown in FIG. 4. In another embodiment, the door bracket 76 may be coupled to the door 20. For example, the door bracket 76 may be fixedly coupled to the door 20. In another example, the door bracket 76 may be removably coupled to the door 20. In a further example, the door bracket 76 may be non-fixedly coupled to the door 20.

Referring to the embodiment of FIG. 4, in the first position 62 the door bracket 76 may be folded in or collapsed on the link bracket 72 when the door 20 is in the closed position. However, as the door 20 moves from the closed position towards the open position, the door bracket 76 may pivot away from the link bracket 72 about the hinge 78 such that an engaging surface of the door bracket 76, coupled to the door 20, is substantially parallel to the track 32. In the position 64 shown in FIG. 4, the door bracket 76 may be substantially perpendicular to the link bracket 72. In any event, as the door 20 moves to its fully open position 66, the link bracket 72 can move to position where it is inclined or angled with respect to the roller assembly 70. In this position 66, the inclination or angular relationship of the link bracket 72 relative to the roller assembly 70 enables the door 20 to open to its fullest open position, thereby enlarging the size of door opening 22.

Figure 5:
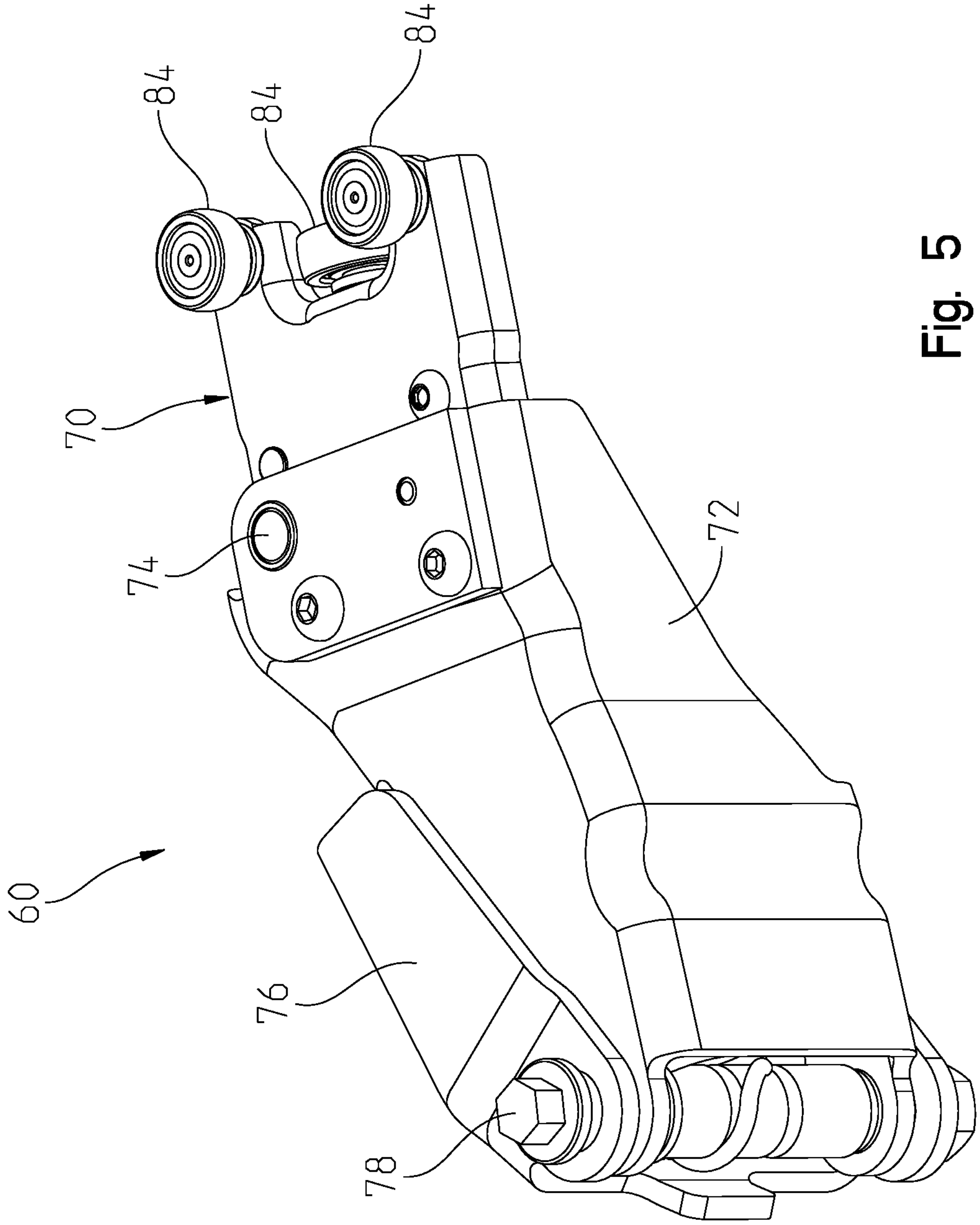
FIG. 5 illustrates a perspective top view of an overtravel hinge in a collapsed configuration.
Figure 6:
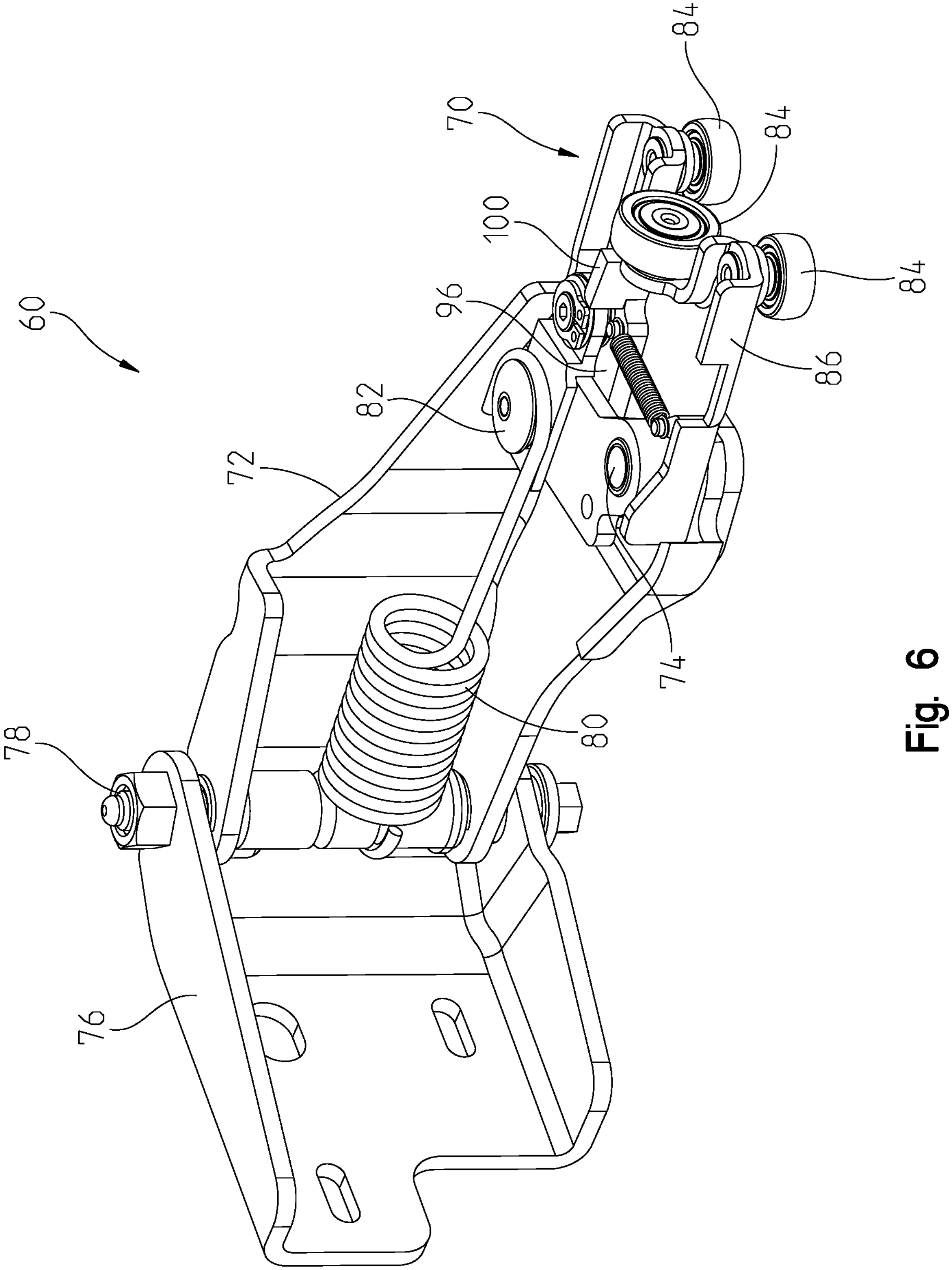
FIG. 6 illustrates a perspective view of a portion of an overtravel hinge to be operatively connected to an inside of a vehicle door.

In another embodiment, a perspective top view of the retractable hinge 60 is illustrated in FIG. 5 and a bottom perspective view of the hinge 60 is illustrated in FIG. 6. The door bracket 76, which is coupled to the door 20, may be pivotally coupled to the link bracket 72 by the hinge 78. The hinge 78 may include, for example, a pin secured at either end via one or more fasteners. The pin may be disposed within apertures formed in flanges of the link bracket 72 and door bracket 76 to facilitate the pivotal movement. In one embodiment, a spring may be at least partially disposed around the pin and between the fasteners or flanges.

As best shown in FIG. 6, some embodiments of the overtravel hinge 60 may include a link bracket spring 80 coupled to the hinge 78 at one end thereof and to the roller assembly 70 at an opposite end. For example, the spring 80 may be coupled to a spring fixture 82 coupled to the roller assembly 70. In one aspect, the link bracket spring 80 may be an extension spring adapted to maintain the position of the link bracket 72 with respect to the roller assembly 70 in the positions 62 and 64 of FIG. 4. The extension spring 80 may be coupled to the pivot 78 and bias the roller assembly 70 to the closed position 62 when the door is closed.

In a further embodiment, the roller assembly 70 may support a plurality of roller bearings which are configured to engage the track of the vehicle. In one example, the roller assembly 70 may include at least one roller bearing. In another example, the roller assembly 70 may include two or more roller bearings. In a further embodiment, the roller assembly 70 may include three roller bearings 84. Other embodiments may have other arrangements besides roller bearings. For example, the roller assembly 70 may have a single wheel which engages the track. In another example, the roller or transport assembly 70 may include a low-friction surface which slides along the track without rolling.

Figure 7:
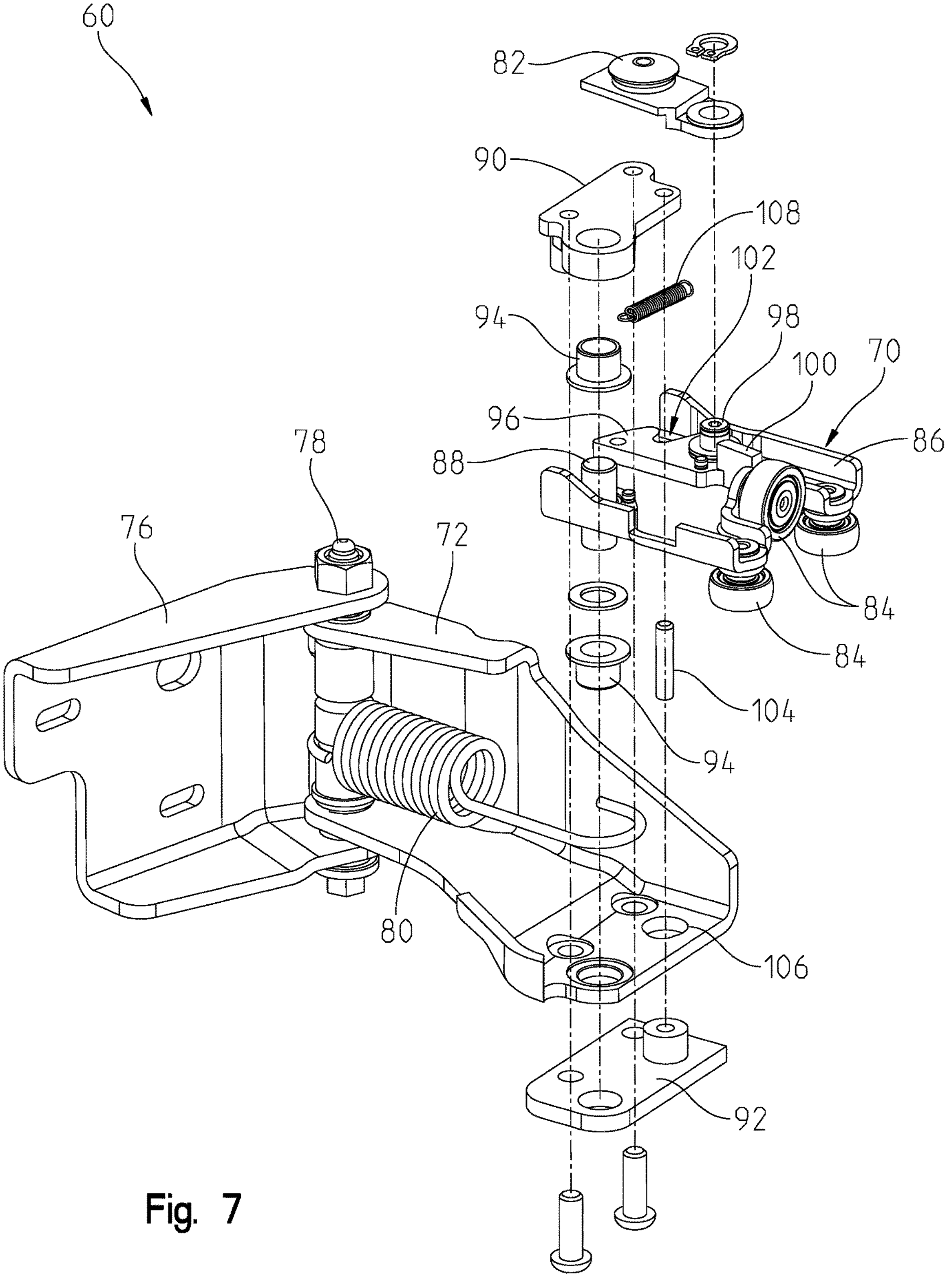
FIG. 7 illustrates a perspective exploded view of an overtravel hinge.

In another embodiment, each of the one or more roller bearings 84 may be supported by a base 86 as best shown in FIGS. 6 and 7. The roller bearings 84 may engage the track 32 and rotate about a respective rotation axis. As each bearing rotates about its respective rotation axis, the hinge 60 may move about the track.

In a further embodiment, the pivot 74 may include a pivot pin 88 as shown in FIG. 7. Here, the pivot pin 88 may extend through an opening in the base 86 as well as through openings defined in a first support block 90, a second support block 92, and link bracket 72. The first and second support blocks 90 and 92, as well as link bracket 72 may provide support for the pivot pin 88 in the form of one or more flanges 94. In one embodiment, the one or more flanges 94 may hold the pivot pin 88 in position. As described above, the link bracket spring 80 may be coupled at one end to the spring fixture 82. As shown in FIG. 7, the spring fixture 82 may be held in place by a pivot 98. The pivot 98 may be a pin, rod, or other support member that extends from the base 86. The spring fixture 82 may include an aperture through which the pivot 98 fits through. A clamp or snapring or other similar feature may removably couple the spring fixture 82 to the base 86 via the pivot 98.

Figure 8:
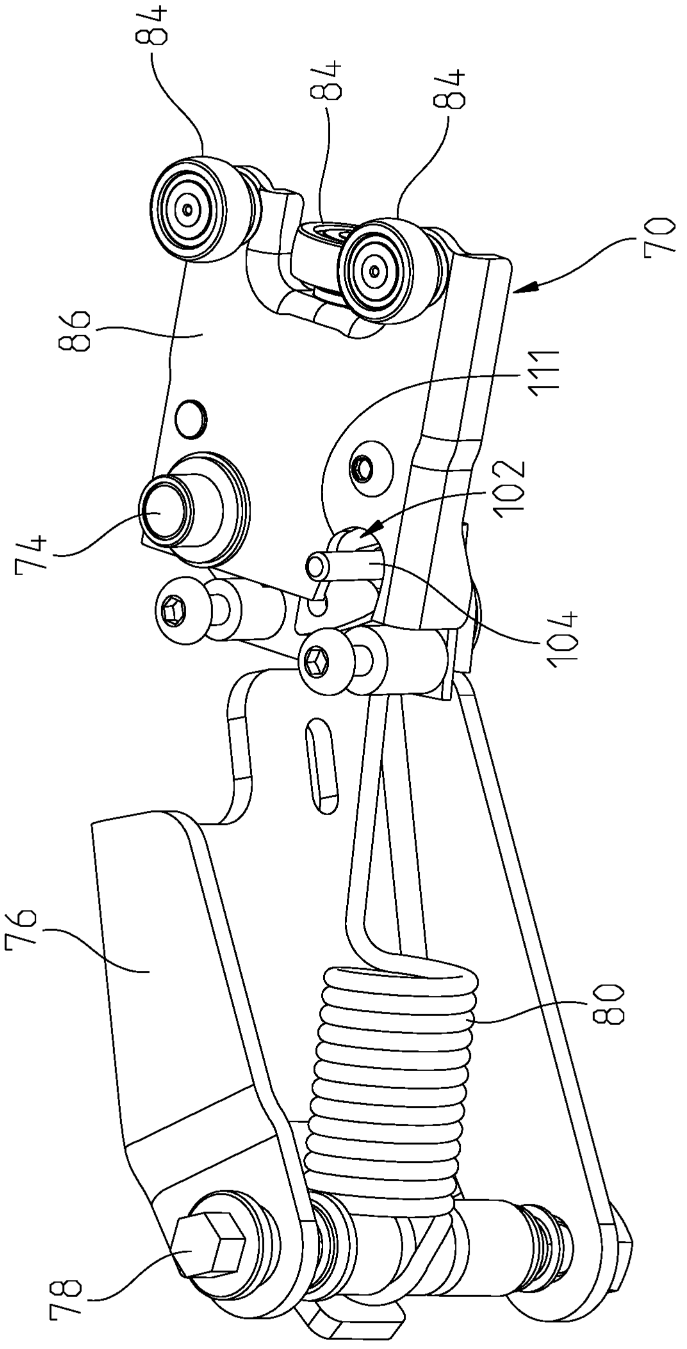
FIG. 8 illustrates a portion of an overtravel hinge.

In some embodiments, the base 86 may also pivotally support a latch 96. As shown in FIG. 8, the latch 96 may comprise a body which is pivotal about the pivot 98. In other words, the latch 96 may pivot about a pivot axis which is defined through the pivot 98. In one embodiment, the latch 96 may include a pawl 100 (see FIGS. 9 and 11). In this embodiment, the pawl 100 may come into contact with a trigger 110 which is coupled to the vehicle track, as shown in FIG. 11. When the pawl 100 contacts the trigger 110, the latch 96 can pivot about the latch pivot 98 (see FIGS. 9, 10, 11, and 12).

In a further embodiment, the latch 96 may include a cutout 102 in its body that is configured to engage a pin 104 that extends through and may be held in place by the first support block 90 and the second support block 92. As shown in FIG. 7, for example, the pin 104 may be coupled to the first support block 90 via an aperture defined therein. Other structural support in the first support block 90 may alternatively couple to the pin 104. With respect to the second support block 92, a protrusion that defines an opening may receive the pin 104. The protrusion may be a cylindrical body integrally formed with or coupled to the second support block 92.

In another embodiment, as shown in FIG. 7 of the present disclosure, the pin 104 may extend through an aperture 106 of the link bracket 72. The cutout 102 of the latch 96 may have an arc-like shape and may be biased in contact with the pin 104 via a lever spring 108 until the pawl 100 engages the trigger 110 which moves the cutout 102 (and thus the latch 96) away from the pin 104. While a spring 108 is shown as a biasing mechanism, other structural biasing members may be used in place of a spring.

Referring to the illustrated embodiment of FIG. 8, the link bracket 72 and the support block 92 are removed to better show the pin 104 with respect to the latch 96. In this embodiment, the pin 104 may extend through the cutout 102 formed in the latch 96 and a recess 111 formed in the base 86. In one embodiment, the pin 104 may be coupled to the link bracket 72. For instance, the pin 104 may be fixedly coupled to the link bracket 72. In another example, the pin 104 may be removably coupled to the link bracket 72. In any event, when the latch 96 is pivoted away from the pin 104, the link bracket 72 may be free to rotate about the pivot 74 which enables the link bracket 72 to move to the position as illustrated at location 66 in FIG. 4. In other words, as the latch 96 disengages from the pin 104, the link bracket 72 is released from the roller assembly 70 such that the link bracket 72 is free to move about the pivot 74 from its intermediate position 64 to the fully open position 66. This release or disengagement of the link bracket 72 enables the door 20 to move further rearward and allow for an increased door opening 22.

Figure 9:
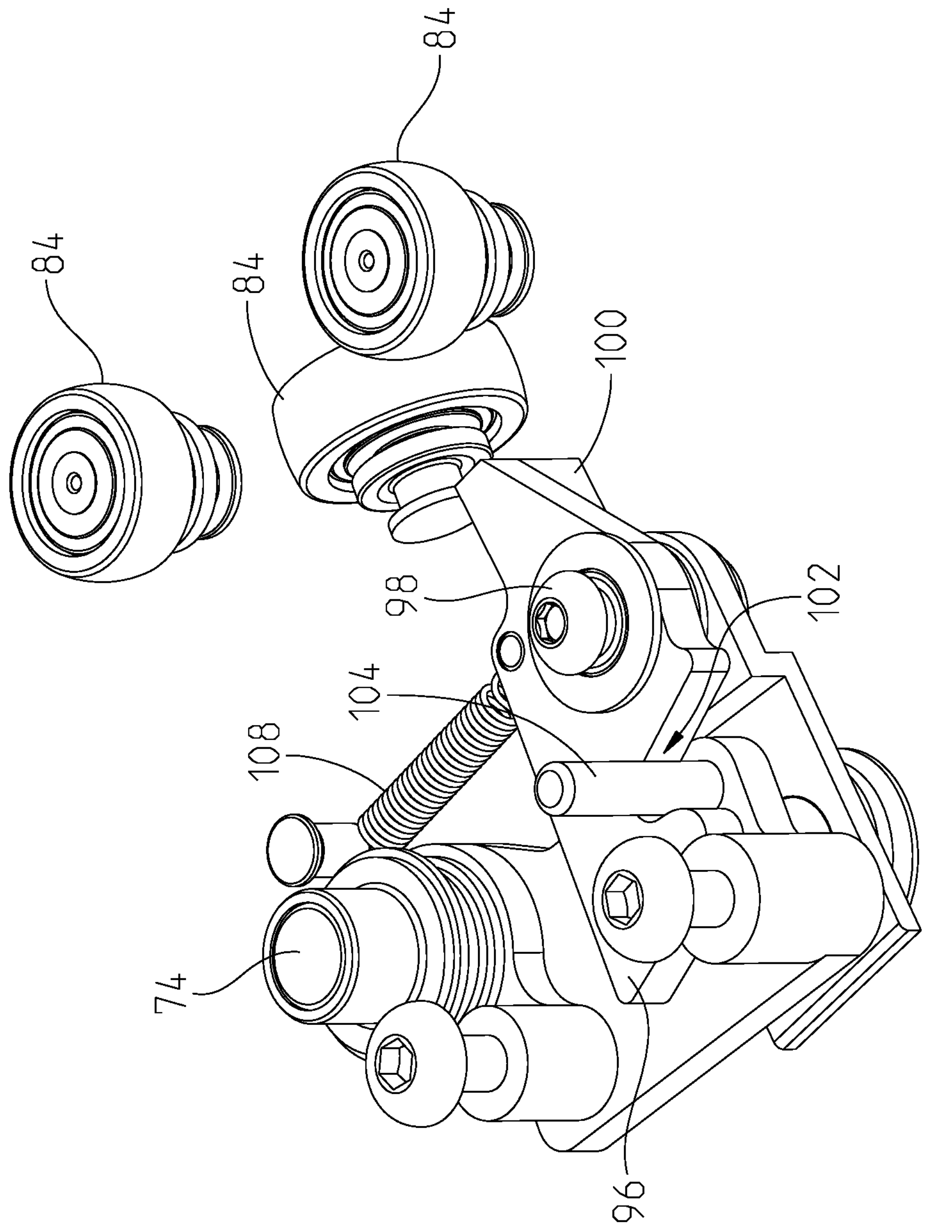
FIG. 9 illustrates a portion of the overtravel hinged of FIG. 8.

In one embodiment, as shown in FIG. 9, the base 86 is removed to better illustrate the latch 96 and the cutout 102 engaging the pin 104. Upon contact of the pawl 100 with the trigger 110, the latch 96 may move or pivot away from the pin 104, thereby permitting movement of the link bracket 72 relative to the roller or transport assembly 70. While the latch 96 is described as being pivotally coupled and thus pivoting relative to the pin 104, it is contemplated in other embodiments that the latch 96 may move in a non-pivotal movement relative to the pin 104. It is further contemplated in a different embodiment that structure other than a pin 104 may be implemented in the hinge 60.

Figure 10:
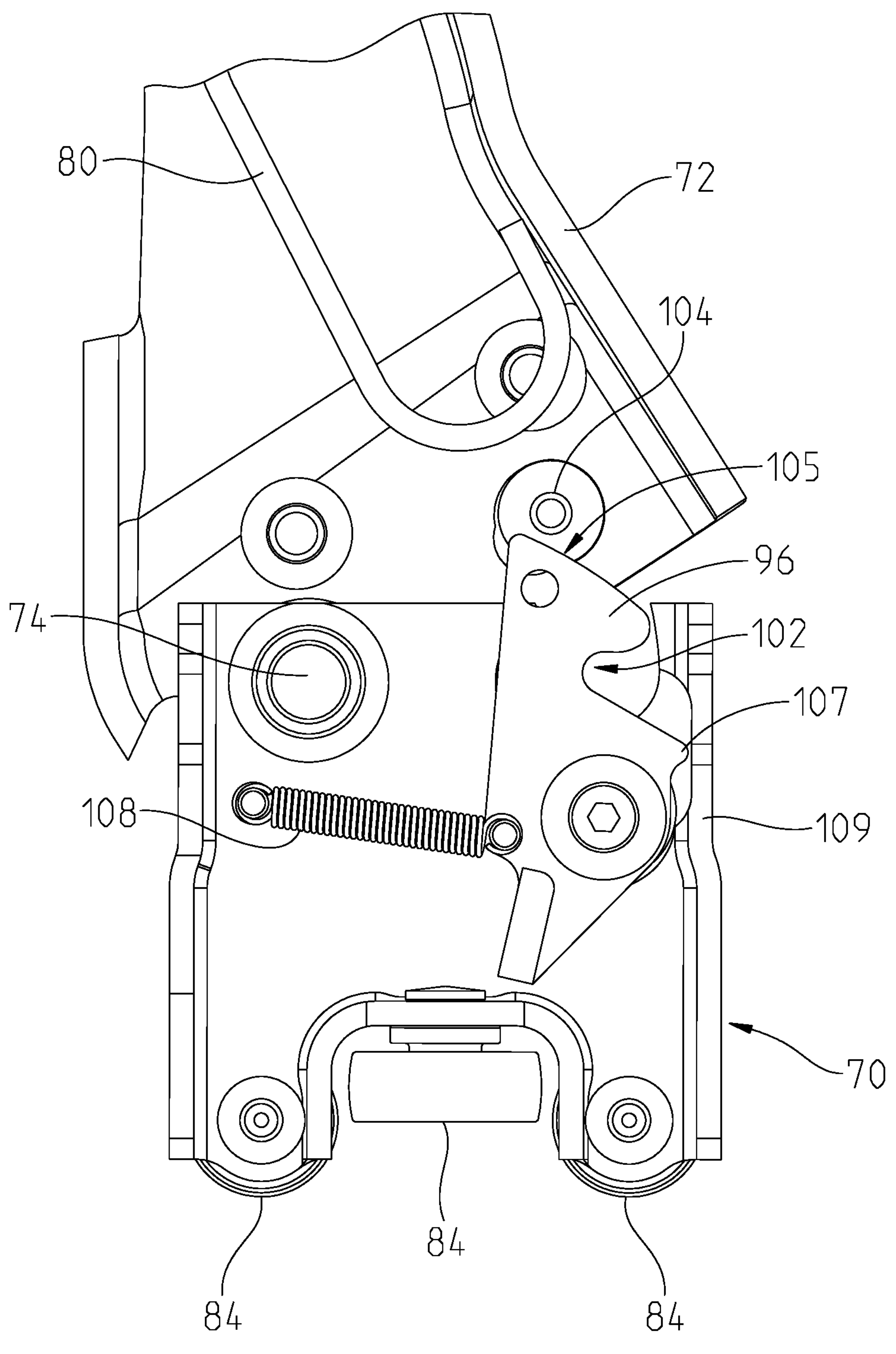
FIG. 10 illustrates a plan view of a link bracket rotatably coupled to a roller assembly.
Figure 11:
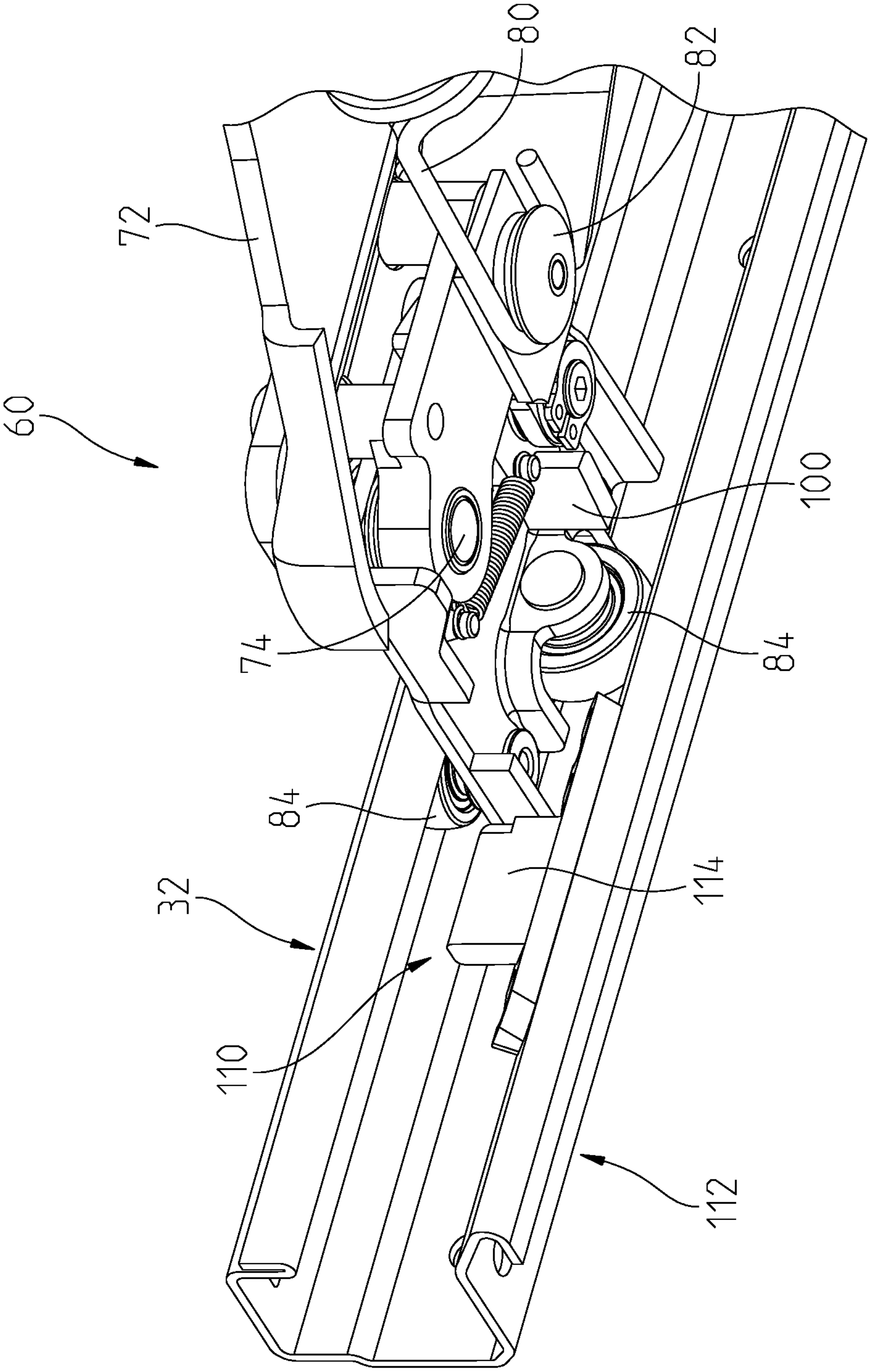
FIG. 11 illustrates a bottom perspective view of a portion of an overtravel hinge engaging a door track.

Referring to an embodiment shown in FIG. 10, the spring 108 can force or bias the latch 96 into contact with or in close proximity to a side wall 109 of the base 86 when the latch 96 is not engaged with the pin 104. In one embodiment, the latch 96 may include a standoff 107 or protruding portion which may maintain the latch 96 a predetermined distance from the side wall 109 of the base 86. For instance, the standoff 107 or protruding portion may keep the latch 96 a desired distance away from the side wall 109 to enable the latch 96 to properly engage the latch pin 104. In a further embodiment, a top surface 105 of the latch 96 may provide a cam-like surface upon which the latch 96 is able to slide or otherwise move along the latch pin 104 which enables the pin 104 to engage the cutout 102.

Figure 12:
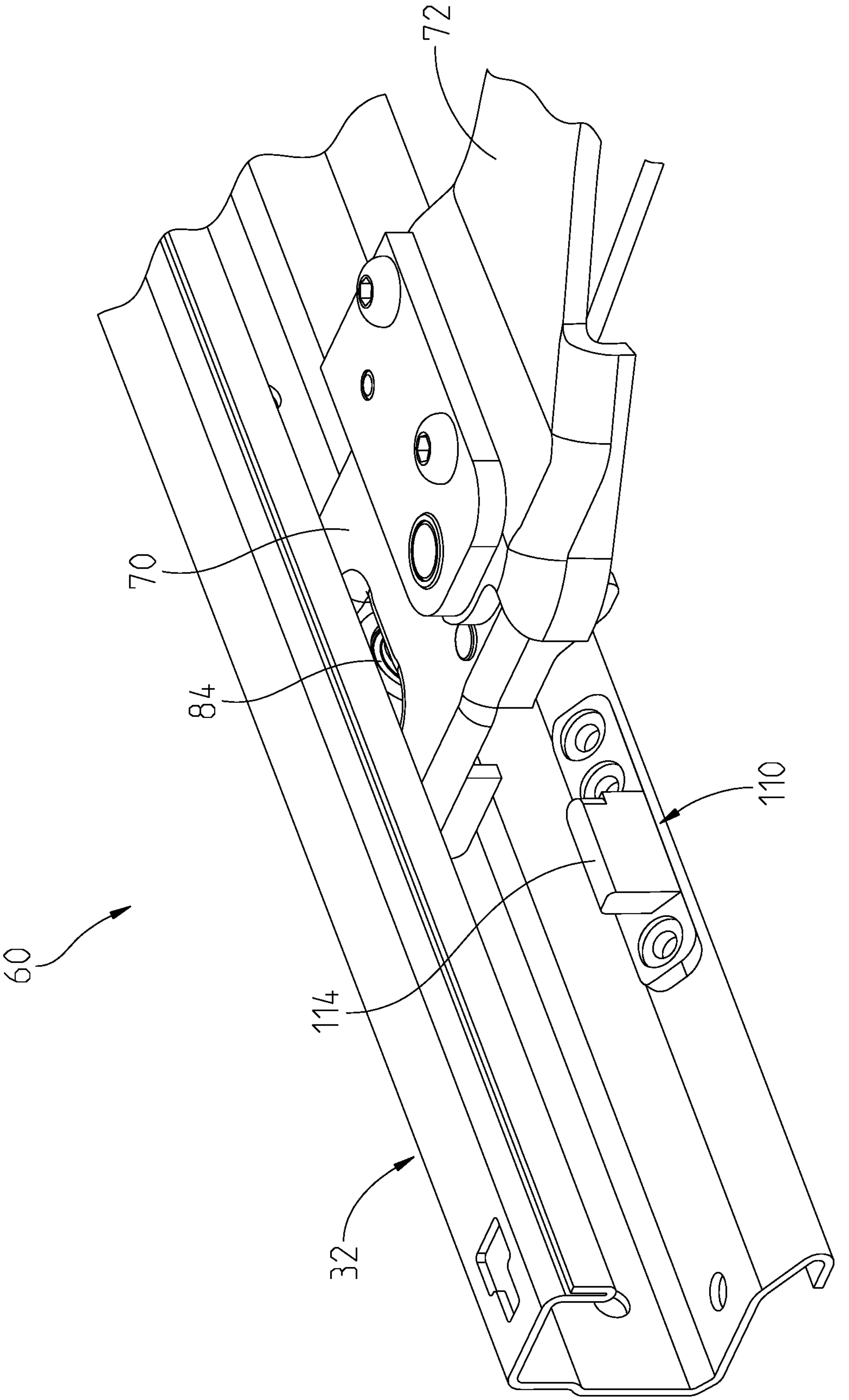
FIG. 12 illustrates a top perspective view of a portion of an overtravel hinge engaging a door track.

In other embodiments such as those shown in FIGS. 11 and 12, the overtravel hinge 60 is illustrated at a location along the track near the third position 66. As shown, the hinge 60 is depicted before the link bracket 72 is released to its fully extended position 66 of FIG. 4. As shown in the embodiment of FIG. 11, the trigger 110 comprises a structure which may be coupled to a lower portion of the track 32. The trigger 110 may include an extended portion 114 which extends upwardly and is aligned with a path traveled by the pawl 100 as the overtravel hinge 60 moves along the track. As the door 20 moves towards it fully open position at the third position 66, the pawl 100 may contact the extended portion 114 of the trigger 110. As it does, this may release the latch 96 from the pin 104 which in turn enables the link bracket 72 to pivot about the pivot 74 relative to the roller or transport assembly 70. By releasing the latch 96, the door 20 may move further rearward so that the door opening 22 achieves a greater sized opening. Upon closing the door, the latch 96 may return to its latched position such that the cutout 102 of the latch re-engages with the pin 104. In addition, the link bracket spring 80 may close or bias the overtravel hinge 60 when the door is closed without any extra actions from the user other than actuating the door handle 25. In this position, the link bracket 72 may return to its latched position such as illustrated at positions 62 and 64.

While a latch 96 is shown and described herein, other devices or mechanisms may be used for releasably engaging the link bracket 72 to the roller or transport assembly 70. For example, a clamping mechanism may be used in place of the latch 96. Alternatively, an actuator (e.g., electric, hydraulic, etc.) may be operably controlled to further release the link bracket 72. In one instance, a solenoid and actuator may be employed to releasably couple the link bracket 72 relative to the transport assembly 70. A signal to the solenoid may energize it to actuate the cylinder or actuator to thereby release the link bracket 72.

In some embodiments, an electronic control system may be implemented where a sensor such as a Hall Effect sensor may be disposed for detecting a position of the hinge 60 or door relative to the track 32. As the door moves from the closed position to the open position, the sensor may communicate with a controller (not shown) the location of the hinge 60 or door. The controller may be programmed to energize the solenoid to actuate the cylinder or actuator at a desired position or location of the hinge or door relative to the track to thereby release the link bracket 72. In other embodiments, a remote control from a key fob or control inside the vehicle may be used to communicate instructions to the controller or solenoid. Other possibilities may be implemented to enable the additional rearward travel of the door when opening it to its fully open position.

Moreover, while a door handle 25 is described as being used by a user to open a vehicle door 20, it is further contemplated that an automatic or electronic door system may be incorporated in the vehicle. In this embodiment, a user control inside the vehicle or on a key fob, for example, may be actuated by a user to open and/or close the door. Further, the door may include a keypad or button which is actuated to open and/or close the door. In an electronic door system, a motor such as an electric motor may be activated by a controller to in turn actuate a cylinder or actuator to initiate movement of the door. The motor may provide the power to propel the door between its open and closed positions. A second motor may be used to move the door from its intermediate or partial open position 64 to its fully open position 66. Alternatively, the same motor may be used to achieve this additional movement.

In another embodiment, an actuator may be used to pivot the link bracket 72 relative to the roller or transport assembly 70. In a further embodiment, an actuator may be used to pivot the door bracket 76 relative to the link bracket 72. In some embodiments, a pair of actuators may be implemented to move the door bracket 76 and link bracket 72. In several embodiments, a latch 96, pin 104, pawl 100 and trigger 110 may be replaced with an electronic control system that includes a sensor for detecting a position of the hinge 60 or door relative to the track. A motor, actuator and the like may be used in conjunction with the sensor to fully control movement of the hinge 60 between its respective positions 62, 64, 66 shown in FIG. 4 of the present disclosure.

While an electric system including sensors, electric motors and electric actuators may be used, in other embodiments a hydraulic control system may be implemented with a hydraulic motor and hydraulic actuator. In other embodiments, a combination of an electric and hydraulic control system may be used to move the hinge 60 between its various positions or configurations.

In some embodiments, a battery may be used to power the one or more motors and actuators to move the hinge 60. The battery may be the conventional vehicle battery, or it may be a second battery. Other power sources may be used as well.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this disclosure pertains and which fall within the limits of the appended claims.

The invention claimed is:

1. A vehicle, comprising:

a chassis;

a door track coupled to the chassis;

a door operatively connected to the door track and adapted to move between a closed position and an open position; and a hinge assembly coupled to the door and movably coupled to the door track, the hinge assembly comprising a first bracket coupled to the door, a second bracket pivotably coupled to the first bracket at a hinge, a transport assembly coupled to the second bracket and adapted to move along the door track as the door moves between the open and closed positions and a coupling member releasably coupled between the second bracket and the transport assembly;

wherein the second bracket is fixed relative to the transport assembly when the coupling member is coupled and can move independently from the transport assembly from a first position to a second position when the coupling member is decoupled;

wherein, upon movement of the second bracket from the first position to the second position, the door moves to an extended open position with respect to the door track.

2. The vehicle of claim 1, wherein the track comprises a first end and a second end, the door being in the closed position when the hinge assembly is located at the first end and the door being in the open position when the hinge assembly is located at the second end;

wherein, when the hinge assembly moves to the second end of the track, the coupling member is decoupled.

3. The vehicle of claim 2, wherein, when the hinge assembly reaches the second end of the track, the transport assembly remains substantially fixed relative to the track as the second bracket moves from its first position to its second position.

4. The vehicle of claim 3, wherein the second bracket pivots relative to the transport assembly between the first and second positions.

5. The vehicle of claim 2, wherein:

when the hinge assembly is at the first end of the track, the first bracket is pivoted inwardly in close proximity to the second bracket;

as the hinge assembly moves from the first end, the first bracket pivots away from the second bracket.

6. The vehicle of claim 2, wherein the hinge assembly is movably disposed in at least a first configuration, a second configuration, and a third configuration;

wherein:

in the first configuration, the door is in its closed position, the hinge assembly is at the first end, the first bracket is pivoted inwardly and the second bracket extends outwardly in a substantially perpendicular position relative the track;

in the second configuration, the door is located between the open and closed positions, the hinge assembly is at the second end of the track, the first bracket is pivoted outwardly and arranged substantially perpendicular to the second bracket, and the second bracket extends outwardly in a substantially perpendicular position relative the track; and in the third configuration, the door is located in the open position, the hinge assembly is at the second end of the track, and the second bracket is pivoted relative to the transport assembly such that the second bracket extends angularly outwardly relative to the track.

7. The vehicle of claim 1, wherein the coupling member is pivotally coupled to the transport assembly, the coupling member comprising a pawl configured to contact a trigger disposed along the door track to induce pivotal movement of the coupling member and release the second bracket from the coupling member.

8. The vehicle of claim 1, wherein the transport assembly comprises at least one rolling member, the at least one rolling member configured to roll along the track as the door moves between the open and closed positions.

9. The vehicle of claim 1, further comprising:

a biasing member coupled between the hinge and the transport assembly, the biasing member adapted to bias the hinge assembly to a closed configuration where the coupling member is coupled.

10. The vehicle of claim 9, wherein the hinge assembly is movable between the closed configuration and an extended configuration wherein the coupling member is decoupled, the hinge assembly is in the closed configuration when the door is in its closed position and the hinge assembly is in the extended configuration when the door is in its open position.

11. The vehicle of claim 1, wherein the coupling member comprises a latching member and a pin configured to be releasably coupled to the latching member, wherein in the first position, the pin is coupled to the latching member and wherein, in the second position, the pin is released from the latching member.

12. The vehicle of claim 11, wherein the latching member is coupled to the transport assembly and the pin is coupled to the second bracket.

13. The vehicle of claim 11, wherein the latching member is coupled to the second bracket and the pin is coupled to the transport assembly.

14. An overtravel hinge assembly for a vehicle door operatively coupled to a door track of a passenger vehicle, the overtravel hinge assembly comprising:

a first bracket adapted to be mounted to the vehicle door;

a second bracket pivotally coupled to the first bracket via a hinge;

a transport assembly pivotally coupled to the second bracket; and a coupling member releasably coupled between the second bracket and the transport assembly;

wherein, the transport assembly comprises a movable member adapted to contact and move along the door track as the vehicle door moves between an open and closed positions;

wherein, the second bracket is fixed relative to the transport assembly when the coupling member is coupled and can move independently from the transport assembly from a first position to a second position when the coupling member is decoupled.

15. The overtravel hinge assembly of claim 14, wherein:

in a closed configuration, the first bracket is pivoted inwardly in close proximity to the second bracket, and the second bracket extends outwardly in a substantially perpendicular position relative the transport assembly;

in an open configuration, the first bracket is pivoted outwardly about the hinge and arranged substantially perpendicular to the second bracket, and the second bracket extends outwardly in a substantially perpendicular position relative the transport assembly; and in an extended configuration, the second bracket extends outwardly from the transport assembly at an angle greater than 90°.

16. The overtravel hinge assembly of claim 15, further comprising a biasing member coupled between the hinge and the transport assembly, the biasing member adapted to bias the hinge assembly to the closed configuration.

17. The overtravel hinge assembly of claim 15, wherein the coupling member is pivotally coupled to the transport assembly, the coupling member comprising a pawl configured to contact a portion of the track to induce pivotal movement of the coupling member and release the second bracket from the coupling member.

18. The overtravel hinge assembly of claim 17, wherein the second bracket comprises a pin configured to be releasably coupled to the coupling member;

wherein, in the closed configuration, the coupling member is coupled to the pin;

wherein, in the extended configuration, the coupling member is released from the pin.

19. The overtravel hinge assembly of claim 18, further comprising:

a first biasing member coupled between the hinge and the transport assembly; and a second biasing member coupled between a base of the transport assembly and the coupling member, the second biasing member configured to bias the coupling member into contact with the pin.

20. A hinge assembly for movably coupling a vehicle door to a vehicle between an open position and a closed position, the vehicle having a chassis and a track coupled to the chassis, the hinge assembly comprising:

a first bracket adapted to be mounted to the vehicle door and a second bracket pivotably coupled to the first bracket at a hinge; and a transport assembly coupled to the second bracket and adapted to move in contact with the track;

a coupling member releasably coupled between the second bracket and the transport assembly;

a biasing member coupled to the transport assembly, the biasing member adapted to bias the hinge assembly to a first configuration;

wherein, the hinge assembly is configured to move between at least the first configuration, a second configuration, and a third configuration;

wherein, in the first and second configurations, the second bracket extends outwardly at a first angle relative to the transport assembly;

wherein, in the third configuration, the second bracket extends outwardly at a second angle relative to the transport assembly, where the second angle is greater than the first angle.

* * * * *